US 6,953,414 B2

(12) United States Patent
Watanabe

(10) Patent No.: US 6,953,414 B2
(45) Date of Patent: Oct. 11, 2005

(54) TRUNNION LINKAGE STRUCTURE FOR TOROIDAL CONTINUOUSLY VARIABLE TRANSMISSION AND METHOD OF ASSEMBLING THE STRUCTURE

(75) Inventor: Jun Watanabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 324 days.

(21) Appl. No.: 10/414,156

(22) Filed: Apr. 16, 2003

(65) Prior Publication Data

US 2003/0216214 A1 Nov. 20, 2003

(30) Foreign Application Priority Data

May 20, 2002 (JP) ........................................ 2002-144176

(51) Int. Cl.⁷ ............................................. F16H 15/38
(52) U.S. Cl. ............................. 476/42; 476/40; 476/46
(58) Field of Search ............................ 476/40, 41, 42, 476/45, 46

(56) References Cited

U.S. PATENT DOCUMENTS

| | | | |
|---|---|---|---|
| 6,206,801 B1 | 3/2001 | Ishikawa et al. | |
| 6,612,962 B2 * | 9/2003 | Mori | ............................. 476/46 |
| 6,616,568 B2 * | 9/2003 | Ooyama | ........................ 476/40 |
| 2001/0016534 A1 | 8/2001 | Oshidari | |
| 2001/0016535 A1 * | 8/2001 | Itoh et al. | ........................ 476/46 |
| 2002/0039948 A1 * | 4/2002 | Ooyama | ........................ 476/40 |
| 2002/0111247 A1 * | 8/2002 | Mori et al. | ..................... 476/46 |
| 2002/0137593 A1 * | 9/2002 | Mori et al. | ..................... 476/46 |
| 2002/0187876 A1 * | 12/2002 | Imanishi | .......................... 476/8 |
| 2003/0195081 A1 * | 10/2003 | Machida et al. | ............... 476/40 |
| 2004/0087412 A1 * | 5/2004 | Mori et al. | ..................... 476/46 |

FOREIGN PATENT DOCUMENTS

| | | |
|---|---|---|
| EP | 0 394 944 A2 | 10/1990 |
| JP | 2001-182793 A | 7/2001 |

* cited by examiner

*Primary Examiner*—David M. Fenstermacher
(74) *Attorney, Agent, or Firm*—Foley & Lardner LLP

(57) ABSTRACT

A trunnion linkage structure of a dual-cavity toroidal CVT, including trunnions each having an axial end portion, an upper link coupled to the axial end portion through a connection hole, a stop and a snap ring mounted to the axial end portion of the trunnion, and a stop positioning portion arranged so as to limit displacement of the stop in a lateral direction substantially perpendicular to the axial direction of the trunnion. A method of assembling the structure, including inserting a jig into the transmission case, placing the snap ring and the stop on the jig, placing the upper link on the stop, inserting the axial end portion of the trunnion into the connection hole so as to position the stop in place on the axial end portion of the trunnion, and guiding the snap ring to the mount position on the axial end portion thereof.

29 Claims, 9 Drawing Sheets

TRUNNION LINKAGE STRUCTURE FOR TOROIDAL CONTINUOUSLY VARIABLE TRANSMISSION AND METHOD OF ASSEMBLING THE STRUCTURE

BACKGROUND OF THE INVENTION

The present invention relates to a trunnion linkage structure for a toroidal continuously variable transmission (CVT), especially, a dual-cavity toroidal CVT, which serves for enhancing efficiency of an assembly operation of the toroidal CVT, and a method of assembling the trunnion linkage structure.

Generally, toroidal CVTs have input and output disks arranged to be rotatable about a common rotation axis, and a plurality of power rollers interposed between the input and output disks in contact therewith via a working fluid (traction oil). Each of the power rollers is supported on a trunnion so as to rotate about a rotation axis and pivotally move about a pivot axis (trunnion axis) perpendicular to the rotation axis thereof. Upon operating the toroidal CVTs, the power rollers are pressed between the input and output disks by applying thereto a load corresponding to a transmission torque. A shear force of the working fluid is caused corresponding to the pressing force applied to the power rollers. Owing to the shear force, the power rollers transmit power between the input and output disks. The power rollers, therefore, tend to be pushed out from a toroidal cavity formed between the input and output disks. In order to avoid the push-out of the power rollers from the toroidal cavity, upper and lower end portions of the trunnion with the power rollers are connected to those of the adjacent trunnion via upper and lower links, respectively. Upon the speed change operation of the toroidal CVT, the respective trunnions are driven by a servo piston to synchronously displace or offset from the non-speed change position where the rotation axes of the power rollers are perpendicular to the common rotation axis of the input and output disks, along a direction of the pivot axis of the power roller, i.e., the trunnion axis, at the identical stroke. The trunnion with the power roller is allowed to pivotally move about the pivot axis due to component of force of the rotation of the input disk. A combined joint is mounted to each of the upper and lower end portions of the trunnion in order to allow the offset and pivot motions of the trunnion.

In a case where a central portion of each of the upper and lower links is pivotally supported to the transmission case by means of a pin, the upper and lower links will not be displaceable in all directions lying in a plane perpendicular to an axis of the pin. In this condition, when one of two pairs of trunnions, namely, the front trunnions or the rear trunnions, interfere with the upper and lower links during the offset motion thereof, the other of the two pairs of the trunnions undergo the interference force in the direction of the pivot axis via the pins acting as a fulcrum. Distribution of the torque to the power rollers on the front and rear trunnions will be deteriorated so that slippage will occur between the power rollers and the input and output disks.

U.S. Patent Application Publication No. U.S. 2001/0016534 A1 (corresponding to Japanese Patent Application First Publication No. 2001-182793) discloses a toroidal CVT including upper and lower links which are swingably moveable upward and downward along trunnion axes. This related art has also proposed the structure in which the upper link and the lower link are displaceable within a limited region along the trunnion axes in order to eliminate interference of the upper and lower links with components other than the trunnions. The limited region is defined between a stop mounted to an axial end portion of each of the trunnions, and a step portion formed on the trunnion. The stop restricts displacement of each of the upper and lower links in a direction in which each of the upper link and the lower link removes from the trunnions, while the step portion restricts displacement of each of the upper and lower links in the opposite direction.

SUMMARY OF THE INVENTION

Upon assembling the toroidal CVT of the related art, first the transmission case is disposed at an upset state in which a top wall of the transmission case is located on a lower side, and then components are in turn inserted into the transmission case via a bottom opening thereof and assembled together to produce the CVT. The stop for the upper link has a diameter larger than a combined joint mounting hole (a connection hole for connecting the trunnion and the upper link) which is formed in the upper link. Therefore, the upper end portion of the trunnion having the combined joint must be engaged in the connection hole of the upper link before the stop is mounted to the upper end portion of the trunnion.

In the case of a dual-cavity toroidal CVT, there are provided a transmission case, two toroidal speed change units each including the same components as described above, and an output gear train disposed between the speed change units so as to transmit the output torque of the respective speed change units. An intermediate housing enclosing the output gear train is supported on a middle portion of a main shaft extending in the transmission case. An assembling operation of the dual-cavity toroidal CVT must be performed in the following order. Before assembling the intermediate housing to the transmission case, the upper link is inserted from the bottom opening of the transmission case located at the upset state, and then the trunnions are coupled to the connection holes of the upper link. Subsequently, the stop is mounted to an upper end portion of the trunnion which projects from the connection hole. The stop mounting operation is cumbersome because the stop mounting operation is conducted in a narrow space by screwing a bolt into an end surface of the upper end portion of the trunnion. This deteriorates efficiency of the assembly operation of the dual-cavity toroidal CVT. Otherwise, the intermediate housing, the upper link and the trunnions may be preassembled to one unit outside the transmission case, and the preassembled unit may be inserted into the transmission case through the bottom opening. In such a case, large modification in the assembly work or a complicated jig may be required in order to hold the unit at the preassembled state. This causes disadvantage in production costs.

An object of the present invention is to eliminate the above-described problems concerning efficiency of the assembly operation of the toroidal CVT, and to provide a trunnion linkage structure for a toroidal CVT and a method of assembling the structure, in which a stop for an upper link can be held in place relative to the upper link and can be mounted to an upper end portion of a trunnion without greatly changing the assembly work of the toroidal CVT or without using the complicated jig.

In one aspect of the present invention, there is provided a trunnion linkage structure for a dual-cavity toroidal continuously variable transmission, the structure comprising:

trunnions each having an axis and an axial end portion;

an upper link displaceable along the axis of the trunnion and formed with connection holes through which the upper link is coupled to the axial end portion of the trunnion;

a stop mounted to the axial end portion of the trunnion, the stop having an outer diameter larger than each of the connection holes and limiting displacement of the upper link in an axial direction of the trunnion in which the upper link is released from the axial end portion of the trunnion;

a snap ring mounted to the axial end portion of the trunnion and performing positioning of the stop in the axial direction of the trunnion; and a stop positioning portion disposed on one of the upper link and the stop and engaged with the other of the upper link and the stop so as to limit displacement of the stop in a lateral direction substantially perpendicular to the axial direction of the trunnion.

In a further aspect of the present invention, there is provided a method of assembling a trunnion linkage structure of a dual-cavity toroidal continuously variable transmission including a transmission casing having a top wall with a hole, the structure including trunnions each having an axis and an axial end portion, an upper link displaceable along the axis of the trunnion and formed with connection holes through which the upper link is coupled to the axial end portion of the trunnion, a stop mounted to the axial end portion of the trunnion, the stop having an outer diameter larger than each of the connection holes and limiting displacement of the upper link in an axial direction of the trunnion in which the upper link is released from the axial end portion of the trunnion, a snap ring mounted to the axial end portion of the trunnion and performing positioning of the stop in the axial direction of the trunnion, and a stop positioning portion disposed on one of the upper link and the stop and engaged with the other of the upper link and the stop so as to limit displacement of the stop in a lateral direction substantially perpendicular to the axial direction of the trunnion, the method comprising:

inserting a jig into the transmission case through the hole of the top wall so as to project an end surface of the jig to an inside of the transmission case;

placing the snap ring and the stop on the end surface of the jig;

placing the upper link on the stop such that the connection hole is coaxially aligned with the stop; and inserting the axial end portion of the trunnion from a side of the upper link more distant from the stop into the connection hole of the upper link until the stop is positioned in place relative to the axial end portion of the trunnion and the snap ring is placed in a mount position where the snap ring is engaged with the axial end portion of the trunnion and limits displacement of the stop in the axial direction of the trunnion.

In a still further aspect of the present invention, there is provided a method of assembling a trunnion linkage structure of a dual-cavity toroidal continuously variable transmission including a transmission casing having a top wall with a hole, the structure including trunnions each having an axis and an axial end portion, an upper link displaceable along the axis of the trunnion and formed with connection holes through which the upper link is coupled to the axial end portion of the trunnion, a stop mounted to the axial end portion of the trunnion, the stop having an outer diameter larger than each of the connection holes and limiting displacement of the upper link in an axial direction of the trunnion in which the upper link is released from the axial end portion of the trunnion, a snap ring mounted to the axial end portion of the trunnion and performing positioning of the stop in the axial direction of the trunnion, and a stop positioning portion disposed on one of the upper link and the stop and engaged with the other of the upper link and the stop so as to limit displacement of the stop in a lateral direction substantially perpendicular to the axial direction of the trunnion, the method comprising:

placing the stop on an inside surface of the top wall of the transmission case;

placing the upper link on the stop such that the connection hole is coaxially aligned with the stop;

inserting the axial end portion of the trunnion from a side of the upper link more distant from the stop into the connection hole of the upper link until the stop is positioned in place relative to the axial end portion of the trunnion;

inserting a first jig into the transmission case through the hole of the top wall until the first jig contacts the axial end portion of the trunnion; and inserting a second jig with the snap ring into the transmission case through the hole of the top wall and guiding the snap ring in cooperation with the first jig to a mount position where the snap ring is engaged with the axial end portion of the trunnion and limits displacement of the stop in the axial direction of the trunnion.

In a still further aspect of the present invention, there is provided a method of assembling a trunnion linkage structure of a dual-cavity toroidal continuously variable transmission including a transmission casing having a top wall with a hole, the structure including trunnions each having an axis and an axial end portion, an upper link displaceable along the axis of the trunnion and formed with connection holes through which the upper link is coupled to the axial end portion of the trunnion, a stop mounted to the axial end portion of the trunnion, the stop having an outer diameter larger than each of the connection holes and limiting displacement of the upper link in an axial direction of the trunnion in which the upper link is released from the axial end portion of the trunnion, a snap ring mounted to the axial end portion of the trunnion and performing positioning of the stop in the axial direction of the trunnion, and a stop positioning portion disposed on one of the upper link and the stop and engaged with the other of the upper link and the stop so as to limit displacement of the stop in a lateral direction substantially perpendicular to the axial direction of the trunnion, the method comprising:

inserting a jig into the transmission case through the hole of the top wall so as to project an end surface of the jig to an inside of the transmission case;

placing the snap ring on the end surface of the jig;

placing the stop in a predetermined position relative to the top wall of the transmission case;

placing the upper link on the stop such that the connection hole is coaxially aligned with the stop;

inserting the axial end portion of the trunnion from a side of the upper link more distant from the stop into the connection hole of the upper link until the stop is positioned in place relative to the axial end portion of the trunnion; and guiding the snap ring placed on the end surface of the jig, to a mount position where the snap ring is engaged with the axial end portion of the trunnion and limits displacement of the stop in the axial direction of the trunnion.

BEST MODE FOR CARRYING OUT THE INVENTION

Figure 1:
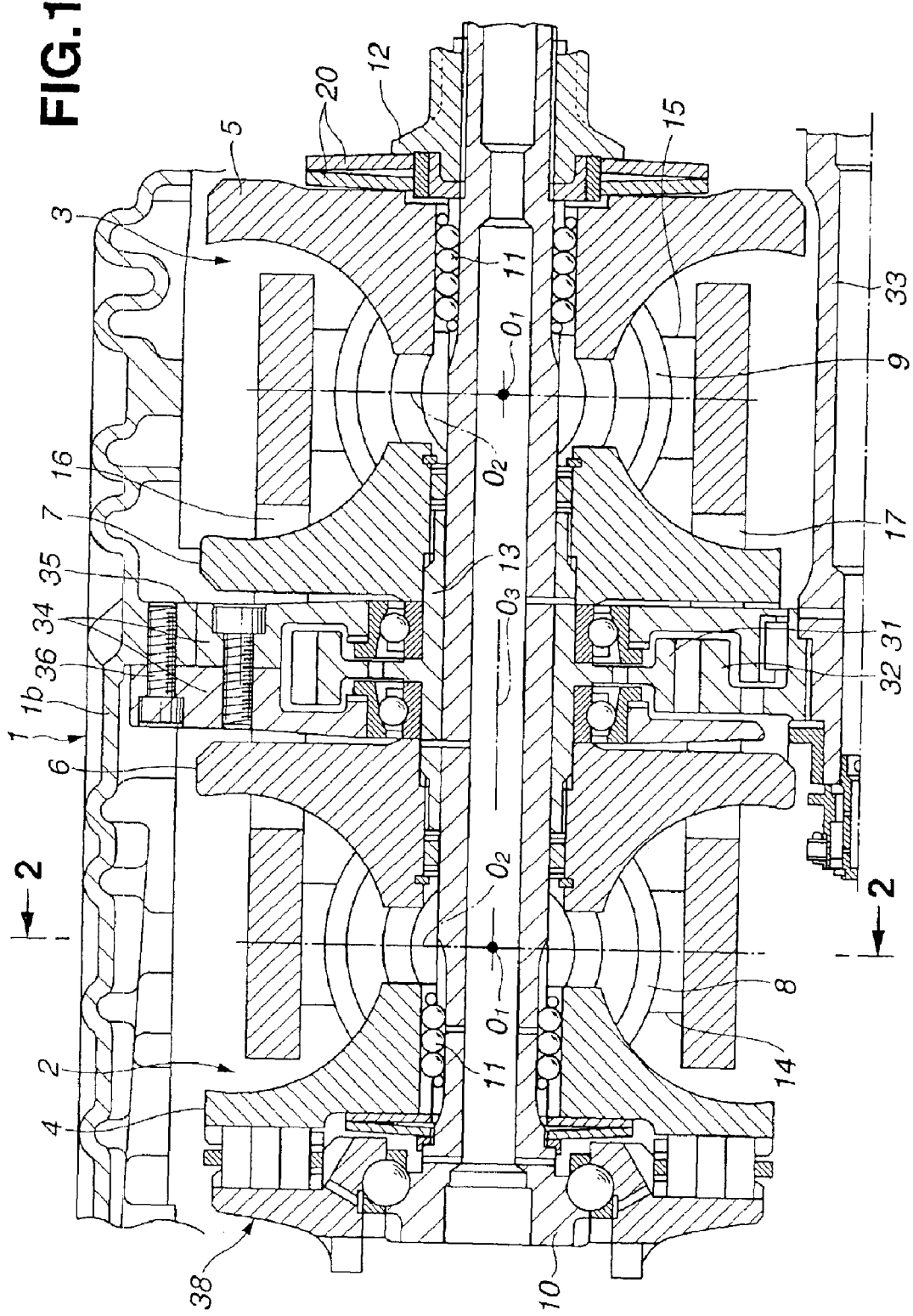
FIG. 1 is a longitudinal and vertical cross-section of a dual-cavity toroidal continuously variable transmission (CVT) with a trunnion linkage structure according to a first embodiment of the present invention.
Figure 2:
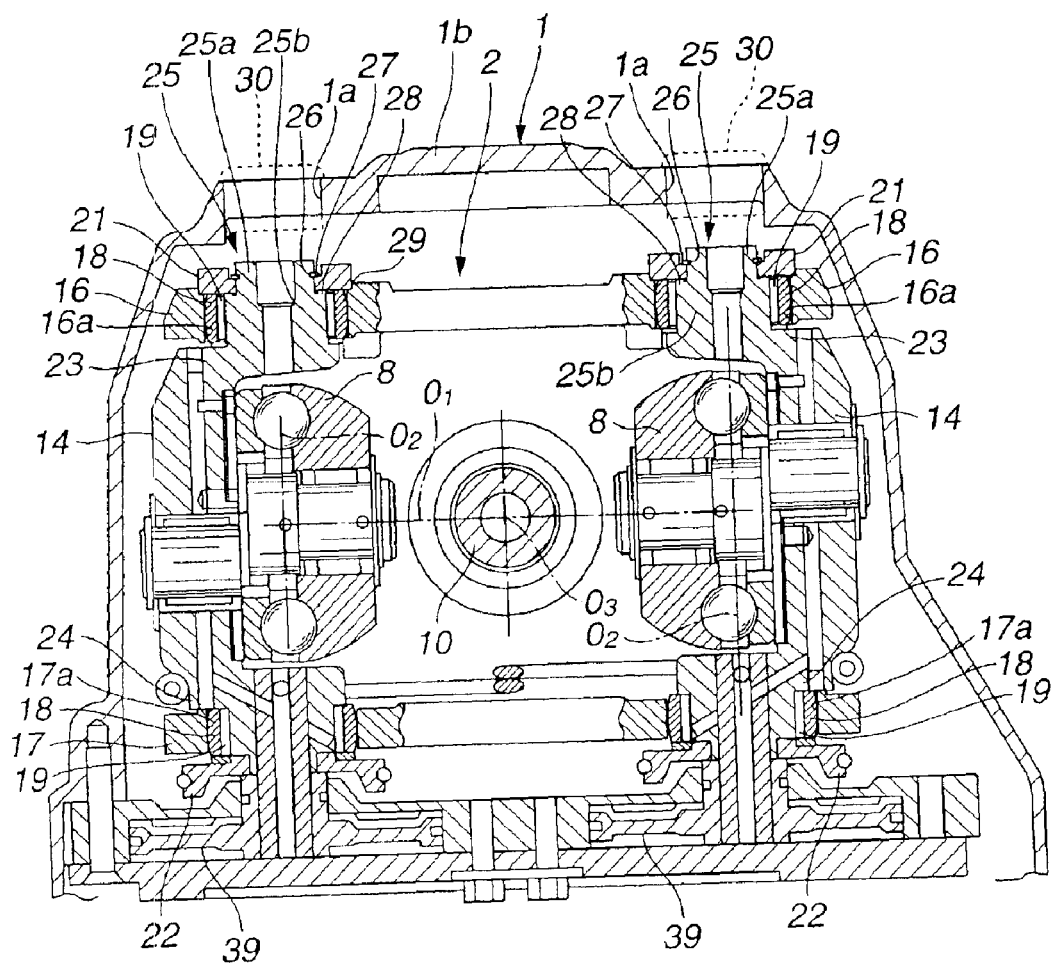
FIG. 2 is a cross-section taken along line 2—2 of FIG. 1.

Referring now to FIGS. 1–2, there is shown a dual-cavity toroidal CVT having a trunnion linkage structure of a first embodiment of the present invention. As illustrated in FIG. 1, the dual-cavity toroidal CVT includes transmission case 1, main shaft 10 rotatably supported within transmission case 1, and front toroidal speed change unit 2 and rear toroidal speed change unit 3 which are arranged adjacent to each other in an axial direction of main shaft 10.

Each of toroidal speed change units 2 and 3 includes coaxially arranged input disk 4, 5 and output disk 6, 7, and power rollers 8, 9 disposed between input and output disks 4 and 6, 5 and 7. Input and output disks 4–7 are supported on main shaft 10 so as to rotate about common rotation axis $O_3$ aligned with the axis of main shaft 10. Input disks 4 and 5 are rotatably engaged with main shaft 10 via ball spline 11 and axially slidable on main shaft 10. Rear-side input disk 5 is prevented from being removed from main shaft 10 by loading nut 12 screwed on main shaft 10 and disc spring 20 adjacent to loading nut 12. Output disks 6 and 7 are connected with each other via hollow output shaft 13 rotatably supported on main shaft 10. Output disks 6 and 7 are arranged back-to-back in an axially spaced relation to each other, between which gear housing 34 is interposed as explained later. Power rollers 8 and 9 transmit power between input and output disks 4–7 via a traction oil film formed between power rollers 8 and 9 and input and output disks 4–7. Power rollers 8 and 9 are diametrically opposed to each other with respect to rotation axis $O_3$ of input and output disks 4–7.

Power rollers 8 and 9 are supported on trunnions 14 and 15, respectively, so as to be rotatable about rotation axes $O_1$. Only two trunnions 14 of front toroidal speed change unit 2 are illustrated in FIG. 2, but two rear trunnions 15 of rear toroidal speed change unit 3 has the same configuration. As illustrated in FIG. 1, front and rear trunnions 14 and 15 have upper end portions 25, namely, axial end portions, disposed near top wall 1b of transmission case 1. Upper end portions 25 of front and rear trunnions 14 and 15 are connected with four corners of generally rectangular plate-shaped upper link 16. Upper link 16 is formed with trunnion connection holes 16a at the four corners thereof, only two of which are shown in FIG. 2. Upper end portions 25 of front and rear trunnions 14 and 15 are introduced into respective trunnion connection holes 16a of upper link 16. Similarly, lower end portions of front and rear trunnions 14 and 15 are connected with four corners of generally rectangular plate-shaped lower link 17. Lower link 17 has substantially the same configuration as that of upper link 16 and trunnion connection holes 17a at the four corners thereof into which the lower end portions of front and rear trunnions 14 and 15 are introduced. Two of trunnion connection holes 17a for the lower end portions of front trunnions 14 are shown in FIG. 2. Front and rear trunnions 14 and 15 are rotatably and angularly moveably joined to upper and lower links 16 and 17 via a combined joint. The combined joint is formed by spherical joint 18 fitted into trunnion connection holes 16a and 17a, and roller bearing 19 installed between spherical joint 18 and respective upper and lower end portions of front and rear trunnions 14 and 15. Upper and lower links 16 and 17 hold front and rear trunnions 14 and 15 in place such that power rollers 8 and 9 can be prevented from being pushed out from the cavity formed by input and output disks 4, 6 and 5, 7 by a loading force applied to input and output disks 4, 6 and 5, 7 as explained later.

Upper and lower links 16 and 17 are displaceable along trunnion axes (pivot axes) $O_2$ of trunnions 14 and 15 without being supported on transmission case 1. The displacing motions of upper and lower links 16 and 17 are limited in order to prevent interference with components other than trunnions 14 and 15. Specifically, the upwardly displacing motion of upper link 16 in an axial direction of trunnions 14 and 15 such that upper link 16 is released from trunnions 14 and 15, is restricted by stops 21 mounted to reduced-diameter shaft portions 25a of upper end portions 25 of trunnions 14 and 15. Upper link 16 and stops 21 are arranged so as to generate a clearance therebetween which is so preset as to permit the relative angular or swing motion of upper link 16 and trunnions 14 and 15. The downwardly displacing motion of upper link 16 in an opposite axial direction of trunnions 14 and 15 is restricted by upper step portions 23 formed on trunnions 14 and 15. On the other hand, the downwardly displacing motion of lower link 17 in an axial direction of trunnions 14 and 15 such that lower link 17 is released from trunnions 14 and 15, is restricted by pivot synchronizing pulleys 22 mounted to lower end portions of trunnions 14 and 15. The upwardly displacing motion of lower link 17 in an opposite axial direction of trunnions 14 and 15 is restricted by lower step portions 24 formed on trunnions 14 and 15.

Upper end portion 25 of each of trunnions 14 and 15 includes first shaft portion 25b and second shaft portion 25a which is connected with first shaft portion 25b and has a diameter smaller than first shaft portion 25b. Second shaft portion 25a is referred to hereinafter as the reduced-diameter shaft portion described above. The combined joint is fitted onto first shaft portion 25b. Reduced-diameter shaft portion 25a outwardly projects from upper link 16 and spherical joint 18 and roller bearing 19 of the combined joint. Stop 21 is fitted onto reduced-diameter shaft portion 25a. Reduced-diameter shaft portion 25a is formed with circumferential groove 26 in which snap ring 27 is engaged. Step portion 28 is disposed between reduced-diameter shaft portion 25a and shaft portion 25b. Snap ring 27 cooperates with step portion 28 to hold stop 21 in place in the direction of trunnion axis $O_2$. With the provision of step portion 28, Stop 21 can be positioned in place using only one snap ring 27.

Stop 21 has an outer diameter larger than trunnion connection hole 16a of upper link 16. Stop positioning portion 29 is provided on a mutually contacting portion between stop 21 and upper link 16 so as to prevent stop 21 from being displaced relative to upper link 16 in a lateral direction substantially perpendicular to the direction of trunnion axis $O_2$. In this embodiment, stop positioning portion 29 is a recessed portion formed along an upper peripheral edge of trunnion connection hole 16a of upper link 16. Stop positioning portion 29 is downwardly recessed from the upper side surface of upper link 16 so as to be engaged with an outer circumferential periphery of a lower portion of stop 21. Alternatively, stop positioning portion 29 may be a cutout which is formed on the outer circumferential periphery of the lower portion of stop 21 so as to be engaged with the upper peripheral edge of trunnion connection hole 16a.

Transmission case 1 includes top wall 1b having holes 1a which are used upon assembling the toroidal CVT as explained later. Holes 1a are arranged in axial alignment with trunnion axes $O_2$ of trunnions 14 and 15. After assembling the toroidal CVT, each of holes 1a is closed by plug 30 indicated by broken line in FIG. 2.

Referring back to FIG. 1, output gear 31 is disposed between output disks 6 and 7 of front and rear toroidal speed change units 2 and 3. Output gear 31 which outwardly extends from an outer circumferential surface of hollow output shaft 13 is integrally formed with output shaft 13. Output gear 31 is meshed with counter gear 32 connected with counter shaft 33. Output gear 31 and counter gear 32 are rotatably accommodated within intermediate housing 34. Intermediate housing 34 is constituted of front and rear halves and fixed to flange 35 inwardly extending from an inner peripheral surface of transmission case 1 by means of fastening bolts 36.

Loading cam 38 transmits input rotation transmitted thereto to respective input disks 4 and 5 of front and rear toroidal speed change units 2 and 3. Namely, loading cam 38 transmits the input rotation to front input disk 4 and then rear input disk 5 via ball spline 11 and main shaft 10. Loading cam 38 also applies a thrust load which is caused by the cam action corresponding to the transmitted torque, to front input disk 4. Front input disk 4 is urged toward front output disk 6 by the thrust load. Reaction force to the thrust load is transmitted to rear input disk 5 via main shaft 10, loading nut 12 and disk spring 20, so that rear input disk 5 is urged toward rear output disk 7. As a result, power rollers 8 and 9 are pressed onto input and output disks 4, 6 and 5, 7, respectively, by the force corresponding to the transmitted torque. This can transmit power between input and output disks 4–7 via power rollers 8 and 9.

As illustrated in FIG. 2, servo pistons 39 are coaxially connected with the lower ends of front trunnions 14. Similarly, servo pistons 39 are provided for rear trunnions 15. Servo pistons 39 drive front and rear trunnions 14 and 15 to synchronously stroke or offset in the same phase (in the same speed-change direction).

Upon the speed change operation of the toroidal CVT, input rotation is transmitted to front and rear input disks 4 and 5 via loading cam 38 as described above. The rotation of input disks 4 and 5 is transmitted to power rollers 8 and 9 via the traction oil film formed therebetween. At this time, power rollers 8 and 9 are rotated about rotation axes $O_1$, $O_1$ and transmit the rotation to output disks 6 and 7 via the traction oil film formed therebetween. The rotation of output disks 6 and 7 is then transmitted to counter shaft 33 via output gear 31 and counter gear 32.

Power rollers 8 and 9 are operated via trunnions 14 and 15 driven by servo pistons 39. When trunnions 14 and 15 are driven to synchronously move along trunnion axes $O_2$ perpendicular to rotation axes $O_1$ of power rollers 8 and 9 at the identical stroke, power rollers 8 and 9 are synchronously offset from initial positions (non-speed change positions) shown in FIGS. 1 and 2 along trunnion axes $O_2$ at the identical stroke. As a result, rotation axes $O_1$ of power rollers 8 and 9 are offset from rotation axis $O_3$ of input and output disks 4–7, and power rollers 8 and 9 are synchronously pivoted about trunnion axes $O_2$ with the identical phase by component of force of the rotation of input disks 4 and 5. This causes continuous change in size of circles traced by contact points between input disks 4 and 5 and power rollers 8 and 9 and circles traced by contact points between power rollers 8 and 9 and output disks 6 and 7. Speed change ratio between input and output disks 4 and 6 and speed change ratio between input and output disks 5 and 7 can be continuously varied while being kept equal to each other. When the speed change ratios reach a preset value, the speed change ratios can be maintained by operating power rollers 8 and 9 to move to the initial positions.

With the trunnion linkage structure described above, upper and lower links 16 and 17 are displaceable within the limited region in the direction of trunnion axes $O_2$ within transmission case 1. This can suppress the occurrence of interference of trunnions 14 and 15 with upper and lower links 16 and 17 during the offset motion of trunnions 14 and 15 upon the speed change operation. Therefore, deterioration of torque distribution to power rollers 8 and 9 supported on trunnions 14 and 15 can be reduced so that slippage of power rollers 8 and 9 on input and output disks 4–7 can be avoided.

Figure 3:
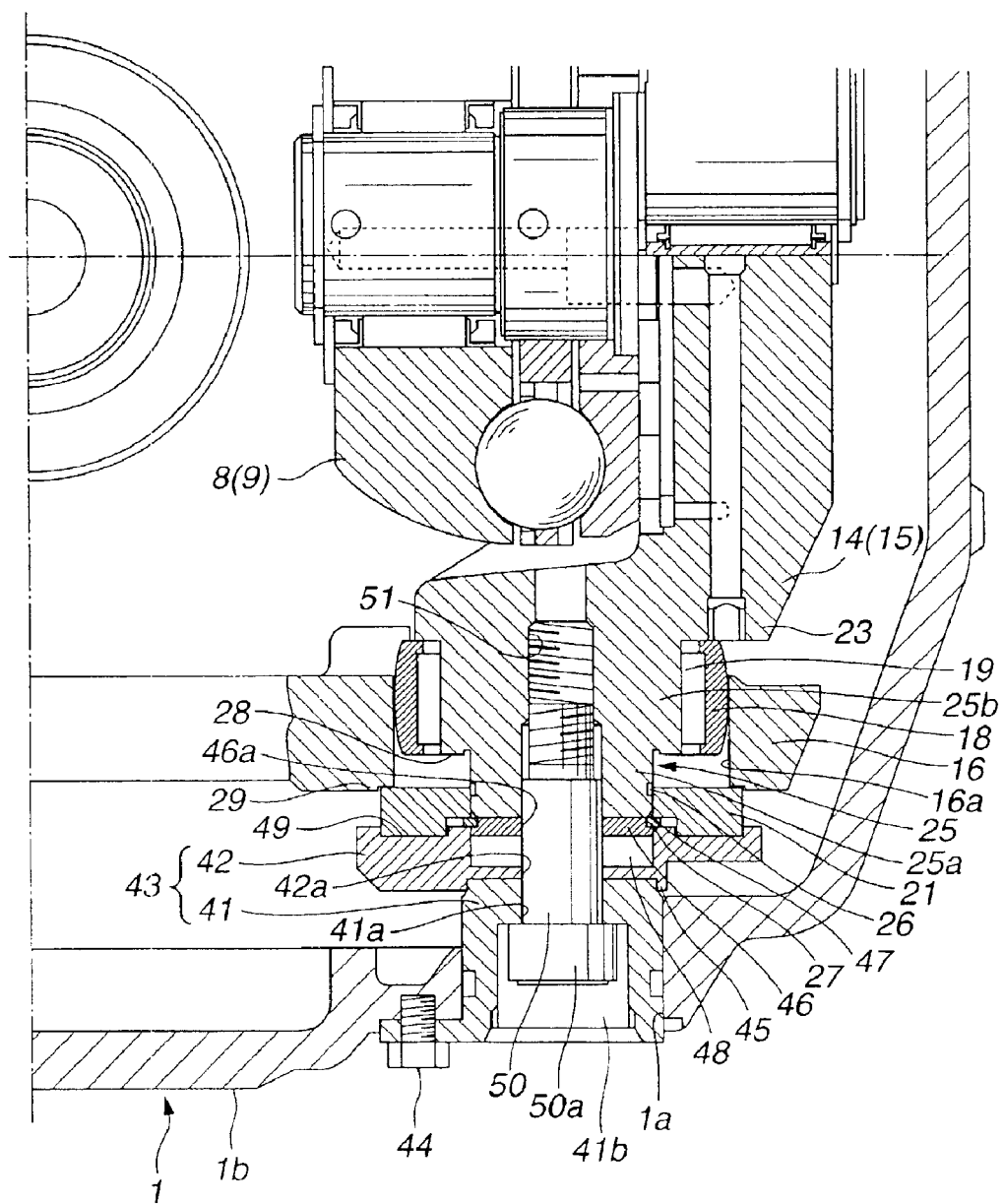
FIG. 3 is an explanatory diagram of a method of assembling the trunnion linkage structure shown in FIGS. 1–2, showing an essential part, in enlarged section, of the structure in the assembling process.
Figure 4:
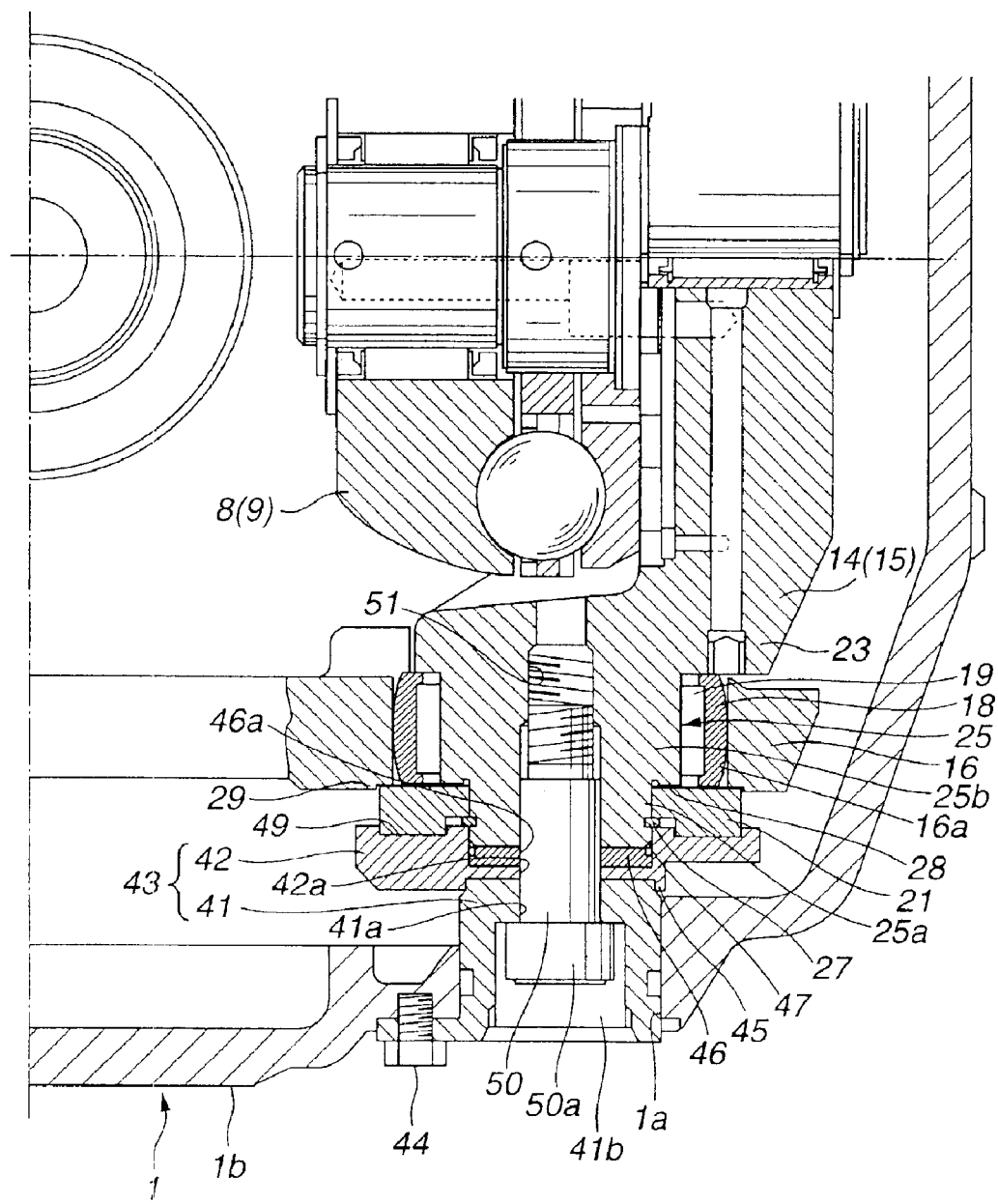
FIG. 4 is a diagram similar to FIG. 3, but showing the essential part of the structure at the assembled state.

A method of assembling the trunnion linkage structure of the toroidal CVT, according to the invention, will be explained hereinafter with reference to FIGS. 3–9. FIGS. 3 and 4 illustrate the method using positioning jig 43 including base portion 41 and support portion 42 mounted onto base portion 41. Base portion 41 and support portion 42 have a common center axis. Base portion 41 has central hole 41a and recess 41b which continuously extend along the center axis. Support portion 42 has central hole 42a and insertion recess 48 which continuously extend along the center axis, and has stop retaining recess 49 on an end surface thereof. Insertion recess 48 is designed to allow insertion of reduced-diameter shaft portion 25a of each of trunnions 14 and 15. Stop retaining recess 49 is designed to engage stop 21 and hold stop 21 in place in a lateral direction perpendicular to the center axis.

As illustrated in FIG. 3, base portion 41 of positioning jig 41 is inserted from the outside of transmission case 1 into hole 1a and fixed to top wall 1b by using screw 44. Subsequently, as shown in FIGS. 3 and 4, transmission case 1 is placed at an upset state in which top wall 1b with hole 1a is located on the lower side. In this upset state, components are in turn inserted to the inside of transmission case 1 through a bottom opening of transmission case 1 located on the upper side in the following manner. First, support portion 42 of positioning jig 43 is placed on an end surface of base portion 41 which is located inside transmission case 1. Support portion 42 is positioned in place in the lateral direction such that central hole 42a is aligned with central hole 41a of base portion 41. The positioning is performed by connecting engaging portions 45 formed on base portion 41 and support portion 42 with each other.

Next, snap ring 27 set on ring adapter 46 is placed on the end surface of support portion 42. Here, snap ring 27 is fitted onto ring adapter 46 in advance of placing snap ring 27 on support portion 42, and reduced-diameter shaft portion 25a of each of trunnions 14 and 15 has tapered end 47 so as to facilitate guiding snap ring 27 on reduced-diameter shaft portion 25a as explained later. Ring adapter 46 has an outer diameter larger than an outer diameter of tapered end 47 of reduced-diameter shaft portion 25a, at the outer periphery onto which snap ring 27 is fitted. In the fitted state, snap ring 27 is expanded such that an inner diameter thereof is larger than the outer diameter of tapered end 47 of reduced-diameter shaft portion 25a. When snap ring 27 is placed on support portion 42, ring adapter 46 is partly engaged in insertion recess 48 to thereby position snap ring 27 in place in the lateral direction. After that, stop 21 is placed on support portion 42 so as to be engaged with stop positioning recess 49.

Next, upper link 16 is placed on stop 21 positioned on support portion 42 of jig 43. Upper link 16 is positioned such that trunnion connection hole 16a is coaxially aligned with a central opening of stop 21, and stop positioning portion 29 is engaged with stop 21. Subsequently, intermediate housing 34 shown in FIG. 1 is inserted into transmission case 1 through the bottom opening and fixed to flange 35 of transmission case 1 by means of bolts 36.

Next, upper end portion 25 of trunnion 14 and 15 which has the combined joint is inserted from a side of upper link 16 more distant from stop 21, namely, from the bottom opening of transmission case 1, into trunnion connection hole 16a of upper link 16 in the following manner using bolt 50. Bolt 50 is inserted from the outside of transmission case 1 into central hole 41a of base portion 41, central hole 42a of support portion 42, and central hole 46a of ring adapter 46. Then, bolt 50 is screwed into upper end portion 25 of trunnion 14 and 15 such that a tip end of bolt 50 is introduced into hole 51 of upper end portion 25, and head 50a of bolt 50 is received in recess 41b of base portion 41. The screwing operation is continued until shaft portion 25b of upper end portion 25 of trunnion 14 and 15 is engaged in trunnion connection hole 16a of upper link 16 as shown in FIG. 4. Upper end portion 25 of trunnion 14 and 15 is thus connected with upper link 16. In the connected state shown in FIG. 4, snap ring 27 is placed in the mount position where snap ring 27 is engaged in circumferential groove 26 of reduced-diameter shaft portion 25a and limits displacement of stop 21 in such an axial direction of trunnion 14 and 15 that stop 21 moves apart from upper link 16. Stop 21 is positioned in place between snap ring 27 and step portion 28 of upper end portion 25. During the screwing operation of bolt 50, shaft portion 25b with the combined joint is inserted into trunnion connection hole 16a, and reduced-diameter shaft portion 25a is slidably inserted together with ring adapter 46 into insertion recess 48. Upon inserting, reduced-diameter shaft portion 25a pushes ring adapter 46 into insertion recess 48 to release snap ring 27 therefrom. Snap ring 27 is guided toward the mount position on the outer surface of reduced-diameter shaft portion 25a. Stop 21 is guided toward step portion 28 on the outer surface of reduced-diameter shaft portion 25a.

The trunnion linkage structure is thus assembled. After that, bolt 50 is unscrewed from hole 51 of upper end portion 25 of trunnion 14 and 15, and then trunnion 14 and 15 is moved away from top wall 1b of transmission case 1. In this state, support portion 42 of jig 43 and ring adapter 46 thereon are taken out from transmission case 1. Then, hole 41a of base portion 41 of jig 43 is closed by a plug (not shown), so that hole 1a of transmission case 1 is closed.

According to the assembly method of the invention, stop 21 can be readily positioned in place relative to reduced-diameter shaft portion 25a of upper end portion 25 of each of trunnions 14 and 15 without using a jig having a complicated structure. This serves for improving efficiency of the assembly operation of the toroidal CVT. Further, since snap ring 27 is fitted onto ring adapter 46 at the expanded state before inserting upper end portion 25 into trunnion connection hole 16a, snap ring 27 can be easily guided onto reduced-diameter shaft portion 25a during the inserting operation of upper end portion 25. This serves for improving the efficiency of the assembly operation of the toroidal CVT. Further, with the provision of tapered end 47 of reduced-diameter shaft portion 25a, the outer diameter of the snap ring fitting portion of ring adapter 46, namely, the inner diameter of snap ring 27 at the expanded state, can be reduced. This serves for facilitating guiding snap ring 27 along the outer surface of reduced-diameter shaft portion 25a. As a result, the efficiency of the assembly operation of the toroidal CVT can be more improved. Furthermore, the positioning of ring adapter 46 and trunnions 14 and 15 relative to jig 43 can be facilitated by using bolt 50 extending from jig 43 into central hole 46a of ring adapter 46 and hole 51 of upper end portion 25. This serves for enhancing the efficiency of the assembly operation of the toroidal CVT. Further, with the provision of stop retaining recess 49 on the end surface of support portion 42 of jig 43, the positioning of stop 21 relative to jig 43 can be easily performed, so that the efficiency of the assembly operation of the toroidal CVT will be improved.

Further, with the provision of stop positioning portion 29 on stop 21 or upper link 16, the positioning of upper link 16 relative to stop 21 can be facilitated. This also serves for enhancing the efficiency of the assembly operation of the toroidal CVT. Furthermore, since jig 43 is constituted of base portion 41 and support portion 42, the mounting operation of jig 43 can be performed in the separate processes. Namely, base portion 41 is previously mounted to top wall 1b of transmission case 1, and then support portion 42 having a relatively small size is inserted into transmission case 1 through the bottom opening. Therefore, jig 43 as a whole need not be inserted into transmission case 1 through the bottom opening. In addition, after the assembly operation, base portion 41 is left on top wall 1b of transmission case 1 so that base portion 41 can be used as the plug closing hole 1a of transmission case 1. This will serve for facilitating cleaning works after the assembly operation.

Figure 5:
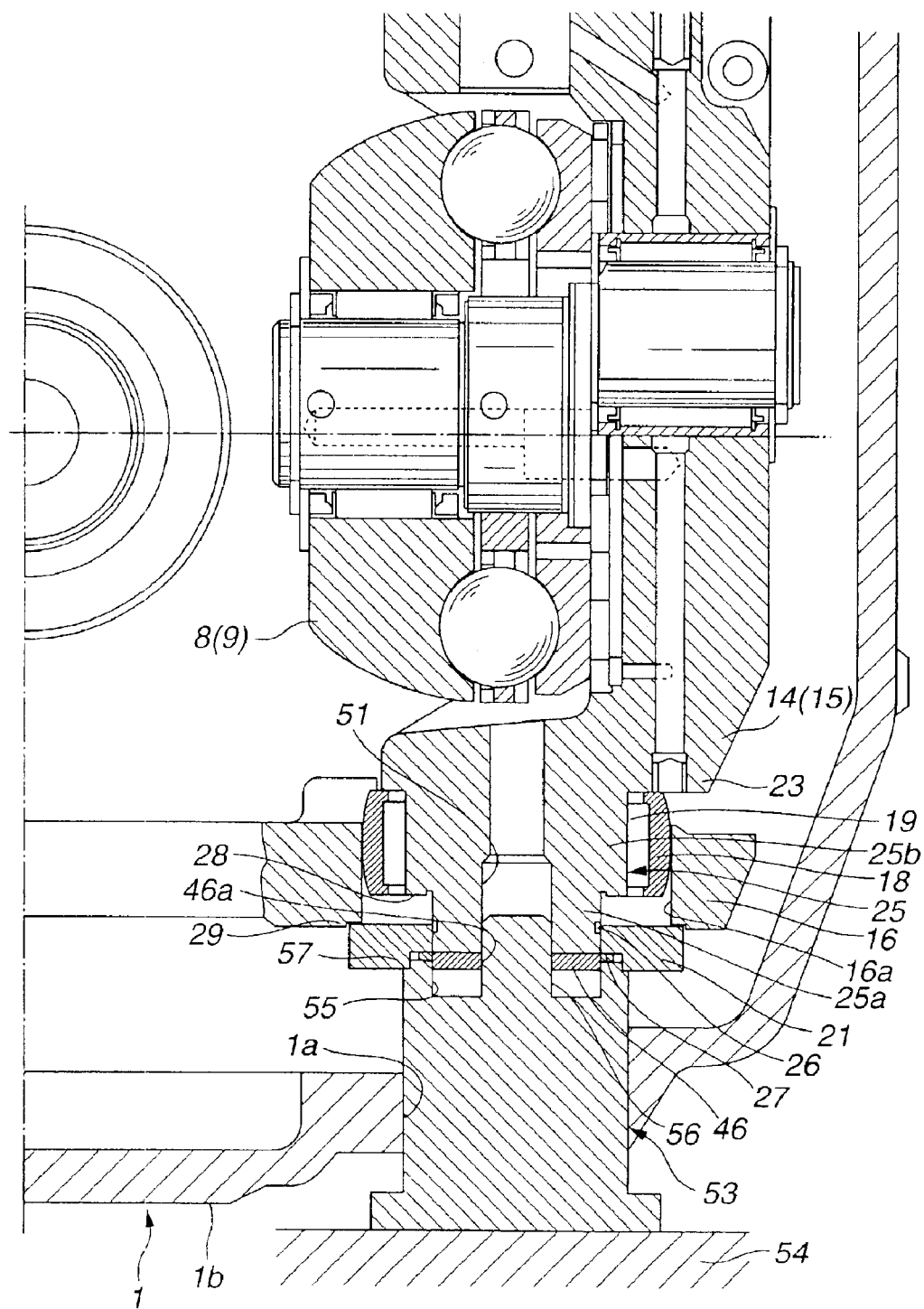
FIG. 5 is a diagram similar to FIG. 3, but showing the assembly method according to a second embodiment of the present invention.
Figure 6:
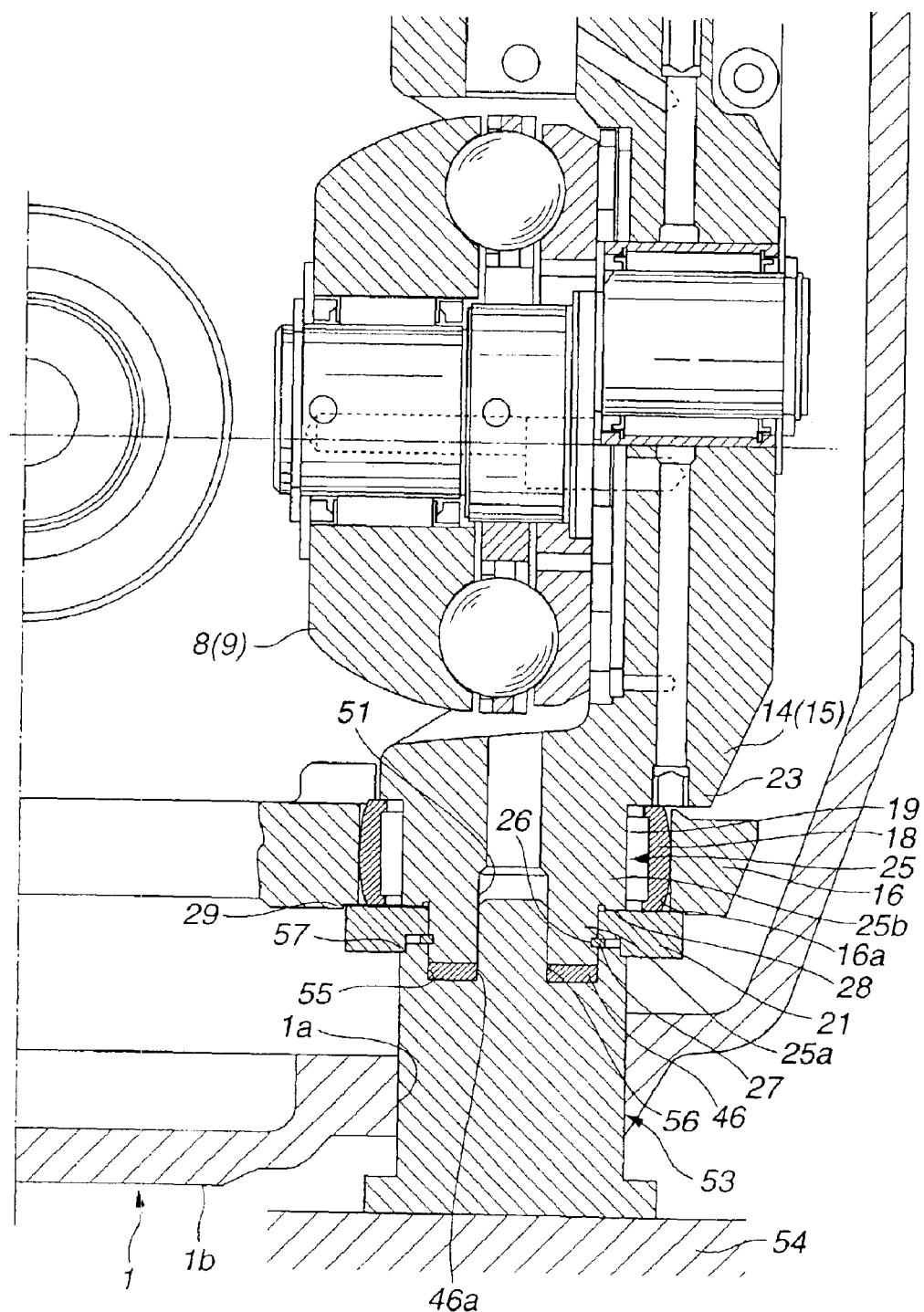
FIG. 6 is a diagram similar to FIG. 5, but showing the essential part of the structure at the assembled state.

Referring now to FIGS. 5 and 6, a second embodiment of the assembly method of the present invention is explained, which differs in using integral positioning jig 53 from the first embodiment using positioning jig 43 constituted of two portions 41 and 42. Like reference numerals denote like parts, and therefore, detailed explanations therefor are omitted. The same number of positioning jigs 53 as that of trunnions 14 and 15 are upright set on platform 54 in coaxial alignment with holes 1a of top wall 1b of transmission case 1.

Each of jigs 53 has annular insertion recess 55 on an end surface thereof. Insertion recess 55 is configured to allow insertion of upper end portion 25 of each of trunnions 14 and 15 thereinto. Central projection 56 extends upward from a bottom of insertion recess 55 beyond the end surface of jig 53. Projection 56 has a length sufficient to be inserted into central hole 46a of ring adapter 46 and hole 51 of upper end portion 25 upon the inserting operation as explained later. Stop retaining recess 57 for positioning stop 21 is provided on the end surface of jig 53 in the form of a cutout along an outer circumferential edge of the end portion of jig 53. Alternatively, such a stop retaining recess may be formed on stop 21.

Upon assembling, transmission case 1 placed at the upset state as shown in FIGS. 5 and 6 is first moved onto platform 54 such that holes 1a receive corresponding jigs 53. Next, as illustrated in FIG. 5, snap ring 27 fitted onto ring adapter 46 is placed on the end surface of jig 53 such that ring adapter 46 is engaged with insertion recess 55 and central hole 46a of ring adapter 46 is engaged with projection 56 of jig 53. The positioning of ring adapter 46 and snap ring 27 relative to jig 53 in the lateral direction is thus performed. Similar to the first embodiment, snap ring 27 is fitted onto ring adapter 46 before placing on jig 53. Upon fitting to ring adapter 46, an inner diameter of snap ring 27 is substantially the same as an outer diameter of reduced-diameter shaft portion 25a of upper end portion 25 of trunnion 14 and 15. Subsequently, stop 21 is placed on jig 53 so as to be engaged in stop retaining recess 57. Stop 21 is thus positioned in place relative to jig 53 in the axial and lateral directions.

Next, upper link 16 is placed on stop 21 positioned on jig 43, and then intermediate housing 34 shown in FIG. 1 is inserted into transmission case 1 and fixed thereto in the same manner as described in the first embodiment.

Next, upper end portion 25 of trunnion 14 and 15 which has the combined joint is inserted into transmission case 1 through the bottom opening. Upper end portion 25 is then inserted into trunnion connection hole 16a of upper link 16 in the following manner. Upper end portion 25 is positioned in place relative to jig 53 by engaging hole 51 of upper end portion 25 of trunnion 14 and 15 with projection 56 of jig 53. In this state, trunnion 14 and 15 is pushed toward top wall 1b of transmission case 1 until shaft portion 25b with the combined joint is inserted into trunnion connection hole 16a of upper link 16 and engaged therein as shown in FIG. 6. Upper end portion 25 of trunnion 14 and 15 is thus connected with upper link 16. In the connected state shown in FIG. 6, snap ring 27 is placed in the mount position as described in the first embodiment, and stop 21 is positioned in place between snap ring 27 and step portion 28 of upper end portion 25. During the pushing operation of trunnion 14 and 15, shaft portion 25b with the combined joint is fitted into trunnion connection hole 16a, and reduced-diameter shaft portion 25a is slidably inserted together with ring adapter 46 into insertion recess 55 of jig 53. Upon inserting, reduced-diameter shaft portion 25a pushes ring adapter 46 into insertion recess 55 to release snap ring 27 from ring adapter 46. Snap ring 27 and stop 21 are guided toward the mount position and step portion 28, respectively, on the outer surface of reduced-diameter shaft portion 25a.

The trunnion linkage structure is thus assembled. After the assembling operation, transmission case 1 is upward moved and separated from jig 53, and then reversed and restored to the original position. Subsequently, hole 1a of top wall 1b of transmission case 1 is closed by plug 30 shown in FIG. 2.

The second embodiment of the assembly method can perform the same effects as described in that of the first embodiment.

Figure 7:
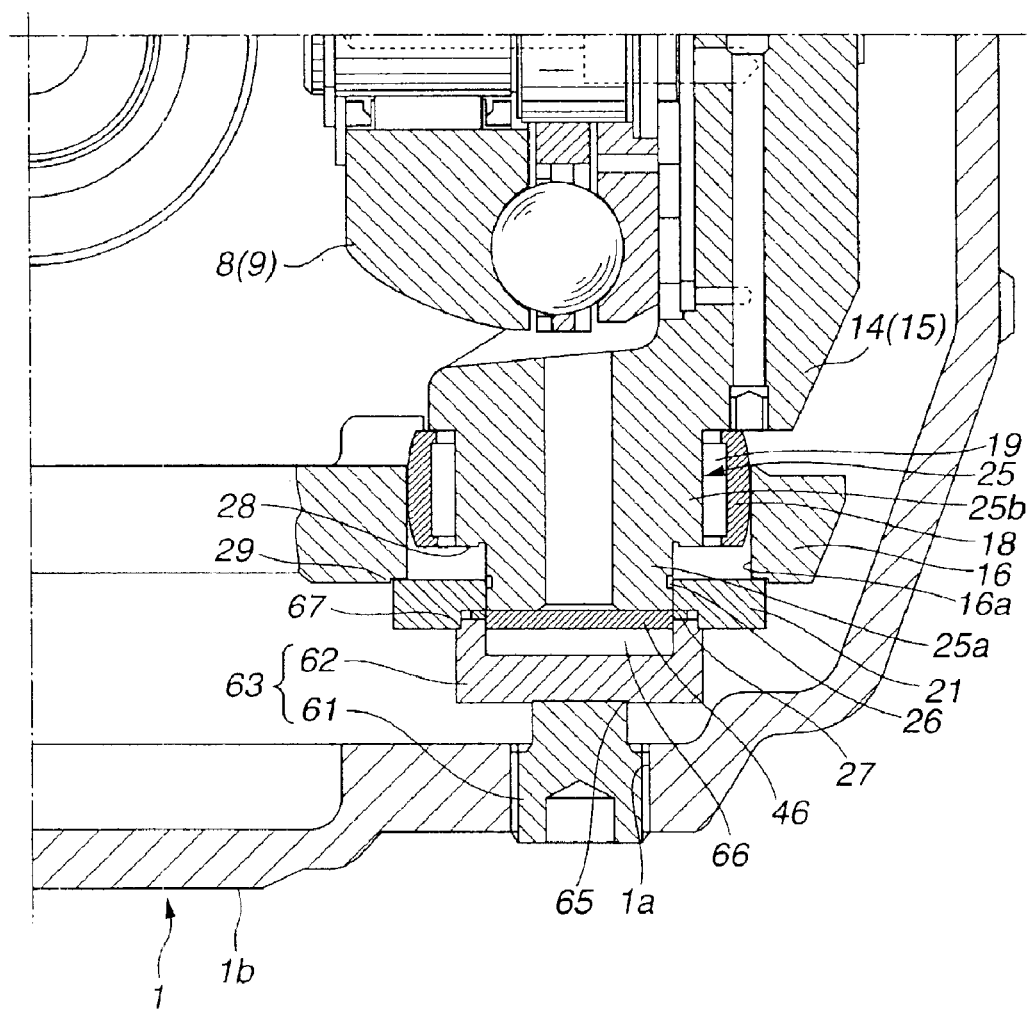
FIG. 7 is a diagram similar to FIG. 3, but showing the assembly method according to a third embodiment of the present invention.

Referring to FIG. 7, a third embodiment of the assembly method will be explained hereinafter. In the third embodiment, positioning jig 63 including base portion 61 and support portion 62 is used. Support portion 62 has insertion recess 66 open to an end surface thereof. Insertion recess 66 is configured to allow insertion of upper end portion 25 of each of trunnions 14 and 15 thereinto. Stop retaining recess 67 for positioning stop 21 is provided on the end surface of jig 63 in the form of a cutout along an outer circumferential edge of the end portion of jig 63. Alternatively, such a stop retaining recess may be formed on stop 21.

Upon assembling, first, base portion 61 of jig 63 is screwed into hole 1a of top wall 1b of transmission case 1 and fixed thereto. Transmission case 1 is upset as shown in FIG. 7, and then support portion 62 of jig 63 is positioned on base portion 61 by coupling engaging portions 65 thereof with each other. After thus setting jig 63 to top wall 1b of transmission case 1, snap ring 27 fitted onto ring adapter 46 is placed on the end surface of support portion 62. Upon placing snap ring 27 on support portion 62, ring adapter 46 is partly engaged in insertion recess 66 so that ring adapter 46 and snap ring 27 are positioned in place relative to jig 63 in the lateral direction. Subsequently, stop 21 is placed on support portion 62 of jig 63 so as to be engaged with stop retaining recess 67. Stop 21 is thus positioned in place relative to support portion 62 in the axial and lateral directions.

Next, upper link 16 is placed on stop 21 positioned on jig 63 and then intermediate housing 34 shown in FIG. 1 is inserted into transmission case 1 and fixed thereto in the same manner as described in the first embodiment.

Next, upper end portion 25 of trunnion 14 and 15 which has the combined joint is inserted into transmission case 1 through the bottom opening. Upper end portion 25 is positioned in alignment with trunnion connection hole 16a of upper link 16. In this state, trunnion 14 and 15 is pushed toward top wall 1b of transmission case 1 until shaft portion 25b with the combined joint is inserted into trunnion connection hole 16a of upper link 16 and engaged therein. Upper end portion 25 is thus connected with upper link 16. In the connected state, snap ring 27 is placed in the mount position as explained in the first embodiment, and stop 21 is positioned in place between snap ring 27 and step portion 28 of upper end portion 25. During the pushing operation of trunnion 14 and 15, shaft portion 25b with the combined joint is fitted into trunnion connection hole 16a, and reduced-diameter shaft portion 25a is slidably inserted together with ring adapter 46 into insertion recess 66 of jig 63. Upon the insertion of reduced-diameter shaft portion 25a, snap ring 27 and stop 21 are guided toward the mount position and step portion 28, respectively, on the outer surface of reduced-diameter shaft portion 25a.

After assembling the trunnion linkage structure as described above, transmission case 1 is upward moved and separated from jig 63, and support portion 62 and ring adapter 46 within insertion recess 66 are taken out from transmission case 1. Base portion 61 is kept engaged in hole 1a of top wall 1b of transmission case 1, and used as a plug closing hole 1a.

The third embodiment of the assembly method can perform the same effects as described in that of the first embodiment.

Figure 8:
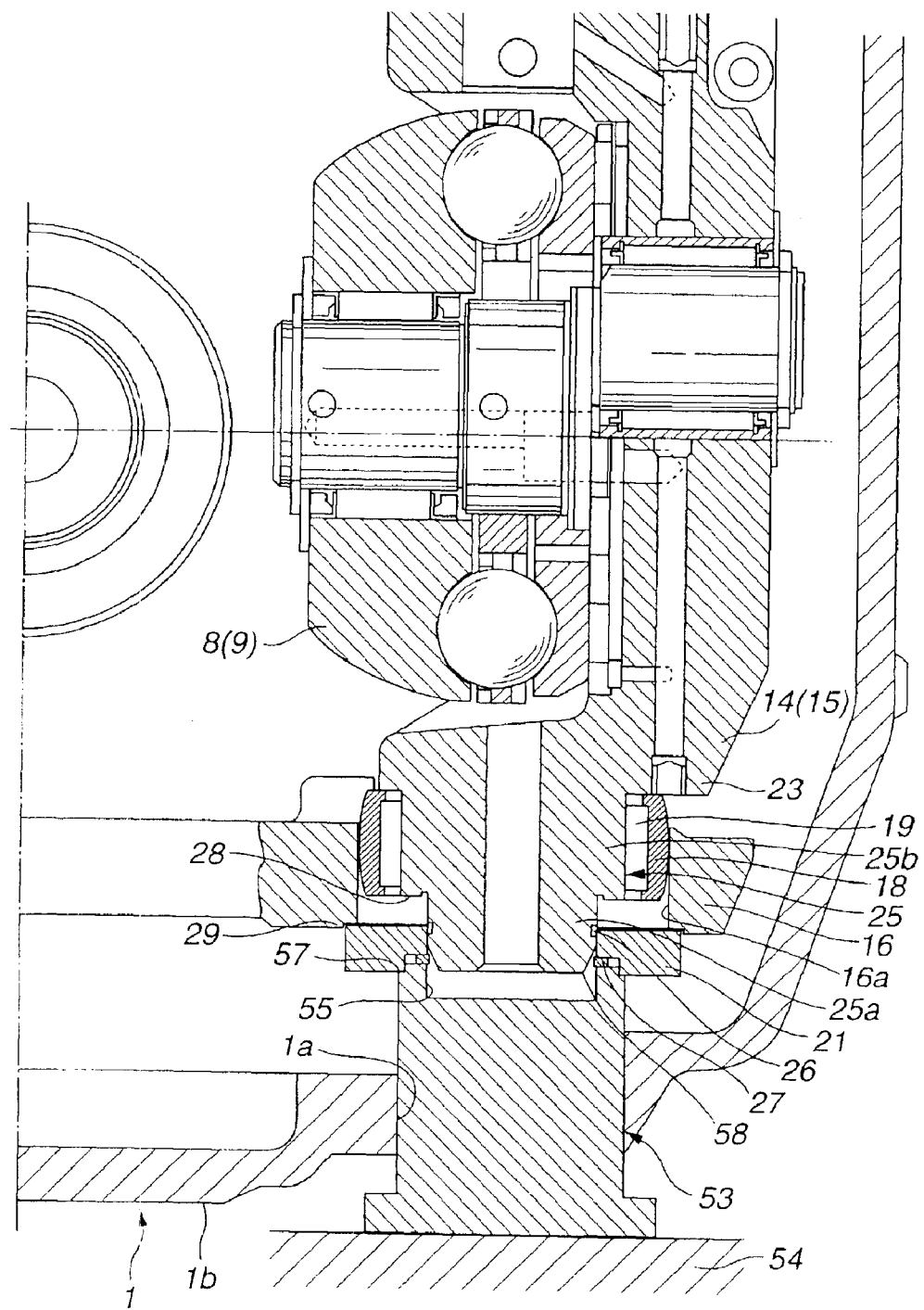
FIG. 8 is a diagram similar to FIG. 3, but showing the assembly method according to a fourth embodiment of the present invention.

Referring to FIG. 8, a fourth embodiment of the assembly method will be explained hereinafter, which differs from the second embodiment shown in FIGS. 5 and 6, in that ring adapter 46 and projection 56 are omitted and that reduced-diameter shaft portion 25a includes tapered end portion 58. Specifically, snap ring 27 is not fitted onto ring adapter 46 and not in an expanded state unlike those of the first to third embodiments. Tapered end portion 58 is located outside of circumferential groove 26 engageable with snap ring 27 and has an outer diameter smaller than an inner diameter of snap ring 27.

Upon assembling, snap ring 27 and stop 21 are in turn placed on positioning jig 53. Next, upper link 16 is placed on stop 21 in the same manner as described in the second embodiment. Upper end portion 25 of trunnion 14 and 15 which has the combined joint is inserted into transmission case 1 through the bottom opening. Upper end portion 25 is positioned in aligned with trunnion connection hole 16a of upper link 16, and then trunnion 14 and 15 is pushed toward top wall 1b of transmission case 1 until shaft portion 25b with the combined joint is inserted into trunnion connection hole 16a and engaged therein. Upper end portion 25 is thus connected with upper link 16. In the connected state, snap ring 27 is placed in the mount position as described in the first embodiment, and stop 21 is positioned in place between snap ring 27 and step portion 28 of upper end portion 25. During the pushing operation of trunnion 14 and 15, shaft portion 25b with the combined joint is fitted into trunnion connection hole 16a, and reduced-diameter shaft portion 25a is slidably inserted into insertion recess 55 of jig 53. Upon the insertion of reduced-diameter shaft portion 25a, tapered end portion 58 is inserted into snap ring 27 in sliding engagement therewith. An inner diameter of snap ring 27 is expanded by tapered end portion 58, and snap ring 27 is guided to the mount position on the outer surface of reduced-diameter shaft portion 25a. Stop 21 is guided on the outer surface of reduced-diameter shaft portion 25a and placed in the position between step portion 28 and snap ring 27.

In the fourth embodiment, the number of jigs can be reduced by omitting ring adapter 46 used in the second embodiment. Further, projection 56 used for positioning ring adapter 46 in the first to third embodiments can be omitted so that positioning jig 53 can be formed into a simple shape.

Figure 9:
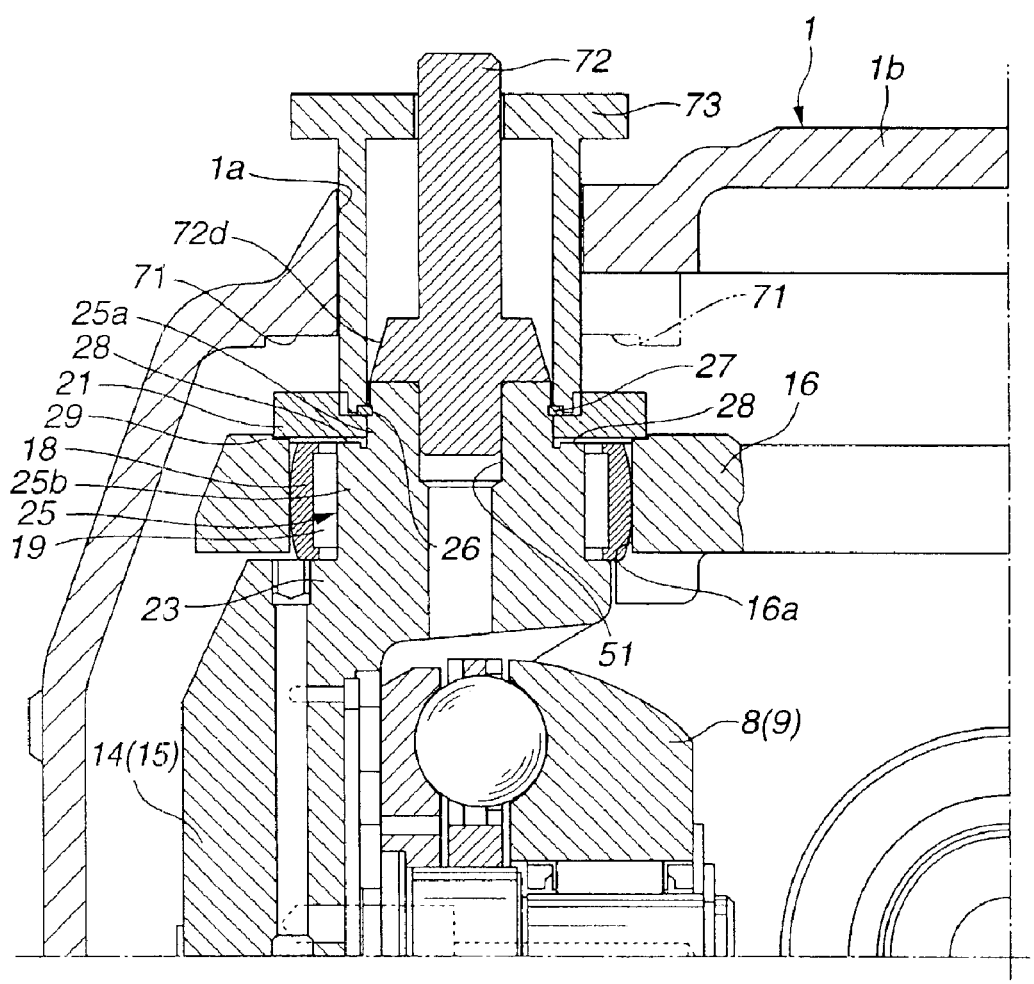
FIG. 9 is a diagram similar to FIG. 3, but showing the assembly method according to a fifth embodiment of the present invention and the essential part of the structure at the assembled state.

Referring now to FIG. 9, a fifth embodiment of the assembly method is explained, which differs from the first to fourth embodiments shown in FIGS. 3–8, in that stop positioning jig portion 71 is formed in transmission case 1 and that snap ring expanding jig 72 and snap ring pushing jig 73 are used. Stop positioning jig portion 71 is formed on an inside surface of top wall 1b of transmission case 1 such that each of stops 21 is positioned in place by jig portion 71. Jig portion 71 is coaxially disposed with hole 1a of top wall 1b of transmission case 1. Snap ring expanding jig 72 is used for expanding snap ring 27 and includes a shaft portion and a generally conical flange radially outwardly extending from the shaft portion and having sloped guide surface 72d along the outer circumference. Snap ring pushing jig 73 is used for pushing snap ring 27 and includes a hollow cylindrical body. Snap ring expanding jig 72 and snap ring pushing jig 73 cooperate to guide snap ring 27 to the mount position on reduced-diameter shaft portion 25a of upper end portion 25 of each of trunnions 14 and 15.

Upon assembling, first, stop 21 is inserted into transmission case 1 placed in the upset state through the bottom opening. Stop 21 is then placed on stop positioning jig portion 71 of top wall 1b of transmission case 1. Next, upper link 16 is placed on stop 21 in the same manner as described in the first embodiment. Subsequently, upper end portion 25 of trunnion 14 and 15 which has the combined joint is inserted into transmission case 1 through the bottom opening. Upper end portion 25 is inserted into trunnion connection hole 16a of upper link 16 in the same manner as described in the third embodiment. Thus, upper end portion 25 is connected with upper link 16. In the connected state, shaft portion 25b with the combined joint is engaged in trunnion connection hole 16a, and reduced-diameter shaft portion 25a is disposed within hole 1a of top wall 1b of transmission case 1. Next, snap ring expanding jig 72 is inserted from the outside of transmission case 1 which may be placed in the upset state or restored to the original state, into hole 1a. Snap ring expanding jig 72 is further moved until a projection of jig 72 is engaged in hole 51 of reduced-diameter shaft portion 25a and an axial end surface of the conical flange thereof is contacted with the end surface of reduced-diameter shaft portion 25a. Reduced-diameter shaft portion 25a is thus positioned in place relative to snap ring expanding jig 72.

Next, snap ring pushing jig 73 having snap ring 27 on an end surface of the cylindrical body is inserted from the outside of transmission case 1 into hole 1a so as to project the end surface of snap ring pushing jig 73 to the inside of transmission case 1. Snap ring 27 is previously fitted onto the end surface of the cylindrical body of snap ring pushing jig 73. During the insertion of snap ring pushing jig 73, snap ring expanding jig 72 cooperates with snap ring pushing jig 73 to guide snap ring 27 along guide surface 72d and expand the inner diameter of snap ring 27. Snap ring pushing jig 73 is further moved until snap ring 27 retained thereon is guided to the mount position where snap ring 27 is engaged with circumferential groove 26 of reduced-diameter shaft portion 25a. When snap ring 27 is in the mount position, stop 21 is positioned in place between snap ring 27 and step portion 28. After the assembly operation, hole 1a of top wall 1b of transmission case 1 is closed by a plug, not shown.

With the provision of stop positioning jig portion 71, positioning jigs 43, 53 and 63 used in the first to fourth embodiments are not necessary and the operation of setting these jigs 43, 53 and 63 to transmission case 1 can be omitted. This can improve efficiency of the assembly operation of the trunnion linkage structure of the toroidal CVT.

This application is based on Japanese Patent Application No. 2002-144176 filed on May 20, 2002, the entire content of which, inclusive of the specification, claims and drawings, is incorporated by reference herein.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A trunnion linkage structure for a dual-cavity toroidal continuously variable transmission, the structure comprising:

trunnions each having an axis and an axial end portion;

an upper link displaceable along the axis of the trunnion and formed with connection holes through which the upper link is coupled to the axial end portion of the trunnion;

a stop mounted to the axial end portion of the trunnion, the stop having an outer diameter larger than each of the connection holes and limiting displacement of the upper link in an axial direction of the trunnion in which the upper link is released from the axial end portion of the trunnion;

a snap ring mounted to the axial end portion of the trunnion and performing positioning of the stop in the axial direction of the trunnion; and a stop positioning portion disposed on one of the upper link and the stop and engaged with the other of the upper link and the stop so as to limit displacement of the stop in a lateral direction substantially perpendicular to the axial direction of the trunnion.

2. The trunnion linkage structure as claimed in claim 1, wherein the stop positioning portion comprises a recessed portion formed on the upper link.

3. The trunnion linkage structure as claimed in claim 1, wherein the axial end portion of the trunnion comprises a first shaft portion and a second shaft portion which is connected with the first shaft portion and has a diameter smaller than the first shaft portion, and a step portion disposed between the first and second shaft portions, the stop and the snap ring being fitted onto the second shaft portion, the step portion cooperating with the snap ring to hold the stop in place in the direction of the axis of the trunnion.

4. The trunnion linkage structure as claimed in claim 1, wherein the second shaft portion of the trunnion is formed with a circumferential groove engageable with the snap ring.

5. A method of assembling a trunnion linkage structure of a dual-cavity toroidal continuously variable transmission including a transmission casing having a top wall with a hole, the structure including trunnions each having an axis and an axial end portion, an upper link displaceable along the axis of the trunnion and formed with connection holes through which the upper link is coupled to the axial end portion of the trunnion, a stop mounted to the axial end portion of the trunnion, the stop having an outer diameter larger than each of the connection holes and limiting displacement of the upper link in an axial direction of the trunnion in which the upper link is released from the axial end portion of the trunnion, a snap ring mounted to the axial end portion of the trunnion and performing positioning of the stop in the axial direction of the trunnion, and a stop positioning portion disposed on one of the upper link and the stop and engaged with the other of the upper link and the stop so as to limit displacement of the stop in a lateral direction substantially perpendicular to the axial direction of the trunnion, the method comprising:

inserting a jig into the transmission case through the hole of the top wall so as to project an end surface of the jig to an inside of the transmission case;

placing the snap ring and the stop on the end surface of the jig;

placing the upper link on the stop such that the connection hole is coaxially aligned with the stop; and inserting the axial end portion of the trunnion from a side of the upper link more distant from the stop into the connection hole of the upper link until the stop is positioned in place relative to the axial end portion of the trunnion and the snap ring is placed in a mount position where the snap ring is engaged with the axial end portion of the trunnion and limits displacement of the stop in the axial direction of the trunnion.

6. The method as claimed in claim 5, wherein the jig comprises a recessed portion formed on the end surface, the method further comprising fitting the snap ring onto a ring adapter, the axial end portion inserting operation comprising inserting the ring adapter into the recessed portion and releasing the snap ring from the ring adapter.

7. The method as claimed in claim 5, wherein the axial end portion of the trunnion comprises a tapered end.

8. The method as claimed in claim 6, wherein the axial end portion of the trunnion comprises a tapered end.

9. The method as claimed in claim 8, wherein the ring adapter has an outer diameter larger than an outer diameter of the tapered end of the axial end portion of the trunnion.

10. The method as claimed in claim 5, wherein the axial end portion of the trunnion is formed with a circumferential groove, the snap ring being engaged with the circumferential groove in the mount position.

11. The method as claimed in claim 5, wherein the end surface of the jig is formed with a recessed portion engageable with the stop, the snap ring and the stop placing operation comprising engaging the stop with the recessed portion to hold the stop in place relative to the jig.

12. The method as claimed in claim 5, wherein the jig comprises a projection extending from the end surface, the ring adapter and the axial end portion of the trunnion each having a hole receiving the projection, the projection and the hole cooperating to position the axial end portion in place relative to the jig upon the axial end portion inserting operation.

13. The method as claimed in claim 5, wherein the upper link placing operation comprises engaging the stop positioning portion with the stop.

14. The method as claimed in claim 5, wherein the jig comprises a base portion extending into the inside of the transmission case through the top wall, and a support portion mounted to the base portion, the support portion having the end surface of the jig.

15. The method as claimed in claim 12, wherein the projection comprises a bolt, the axial end portion comprising a bolt hole, the axial end portion inserting operation comprising inserting the bolt from an outside of the transmission case and screwing the bolt into the bolt hole.

16. A method of assembling a trunnion linkage structure of a dual-cavity toroidal continuously variable transmission including a transmission casing having a top wall with a hole, the structure including trunnions each having an axis and an axial end portion, an upper link displaceable along the axis of the trunnion and formed with connection holes through which the upper link is coupled to the axial end portion of the trunnion, a stop mounted to the axial end portion of the trunnion, the stop having an outer diameter larger than each of the connection holes and limiting displacement of the upper link in an axial direction of the trunnion in which the upper link is released from the axial end portion of the trunnion, a snap ring mounted to the axial end portion of the trunnion and performing positioning of the stop in the axial direction of the trunnion, and a stop positioning portion disposed on one of the upper link and the stop and engaged with the other of the upper link and the stop so as to limit displacement of the stop in a lateral direction substantially perpendicular to the axial direction of the trunnion, the method comprising:

placing the stop on an inside surface of the top wall of the transmission case;

placing the upper link on the stop such that the connection hole is coaxially aligned with the stop;

inserting the axial end portion of the trunnion from a side of the upper link more distant from the stop into the connection hole of the upper link until the stop is positioned in place relative to the axial end portion of the trunnion;

inserting a first jig into the transmission case through the hole of the top wall until the first jig contacts the axial end portion of the trunnion; and inserting a second jig with the snap ring into the transmission case through the hole of the top wall and guiding the snap ring in cooperation with the first jig to a mount position where the snap ring is engaged with the axial end portion of the trunnion and limits displacement of the stop in the axial direction of the trunnion.

17. The method as claimed in claim 16, wherein the axial end portion of the trunnion is formed with a circumferential groove, the snap ring being engaged with the circumferential groove in the mount position.

18. The method as claimed in claim 16, wherein the axial end portion of the trunnion includes a hole, the first jig projecting into the hole to position the axial end portion of the trunnion in place.

19. A method of assembling a trunnion linkage structure of a dual-cavity toroidal continuously variable transmission including a transmission casing having a top wall with a hole, the structure including trunnions each having an axis and an axial end portion, an upper link displaceable along the axis of the trunnion and formed with connection holes through which the upper link is coupled to the axial end portion of the trunnion, a stop mounted to the axial end portion of the trunnion, the stop having an outer diameter larger than each of the connection holes and limiting displacement of the upper link in an axial direction of the trunnion in which the upper link is released from the axial end portion of the trunnion, a snap ring mounted to the axial end portion of the trunnion and performing positioning of the stop in the axial direction of the trunnion, and a stop positioning portion disposed on one of the upper link and the stop and engaged with the other of the upper link and the stop so as to limit displacement of the stop in a lateral direction substantially perpendicular to the axial direction of the trunnion, the method comprising:

inserting a jig into the transmission case through the hole of the top wall so as to project an end surface of the jig to an inside of the transmission case;

placing the snap ring on the end surface of the jig;

placing the stop in a predetermined position relative to the top wall of the transmission case;

placing the upper link on the stop such that the connection hole is coaxially aligned with the stop;

inserting the axial end portion of the trunnion from a side of the upper link more distant from the stop into the connection hole of the upper link until the stop is positioned in place relative to the axial end portion of the trunnion; and guiding the snap ring placed on the end surface of the jig, to a mount position where the snap ring is engaged with the axial end portion of the trunnion and limits displacement of the stop in the axial direction of the trunnion.

20. The method as claimed in claim 19, wherein a recessed portion engageable with the stop is formed in the end surface of the jig, the recessed portion being placed in the predetermined position, the stop placing operation comprising engaging the stop with the recessed portion to hold the stop in place relative to the jig.

21. The method as claimed in claim 19, wherein a recessed portion engageable with the stop is formed in an inside surface of the top wall of the transmission case along a periphery of the hole of the transmission case, the recessed portion being placed in the predetermined position, the stop placing operation comprising engaging the stop with the recessed portion to hold the stop in place relative to the transmission case.

22. The method as claimed in claim 19, wherein the guiding operation is conducted during the axial end portion inserting operation.

23. The method as claimed in claim 19, wherein the axial end portion of the trunnion comprises a tapered end.

24. The method as claimed in claim 19, wherein the axial end portion of the trunnion is formed with a circumferential groove, the snap ring being engaged with the circumferential groove in the mount position.

25. The method as claimed in claim 19, wherein the upper link placing operation comprises engaging the stop positioning portion with the stop.

26. The method as claimed in claim 19, wherein the snap ring placing operation is performed using a ring adapter 46 onto which the snap ring is fitted.

27. The method as claimed in claim 19, wherein the jig comprises a projection extending from the end surface, the axial end portion of the trunnion having a hole receiving the projection, the projection and the hole cooperating to position the axial end portion in place relative to the jig upon the axial end portion inserting operation.

28. The method as claimed in claim 19, wherein the guiding operation is performed using a second jig cooperating the first jig, the second jig having a sloped guide surface.

29. The method as claimed in claim 28, wherein the axial end portion of the trunnion includes a hole, the second jig projecting into the hole to position the axial end portion of the trunnion in place.

* * * * *